United States Patent
Van Veen et al.

(10) Patent No.: US 8,326,152 B2
(45) Date of Patent: Dec. 4, 2012

(54) SYSTEM AND METHOD FOR SCHEDULING TIMESLOTS FOR TRANSMISSION BY OPTICAL NODES IN AN OPTICAL NETWORK

(75) Inventors: Doutje T. Van Veen, New Providence, NJ (US); Adriaan J. De Lind Van Wijngaarden, New Providence, NJ (US); Dusan Suvakovic, Pleasanton, CA (US)

(73) Assignee: Alcatel Lucent, Paris (FR)

( * ) Notice: Subject to any disclaimer, the term of this patent is extended or adjusted under 35 U.S.C. 154(b) by 274 days.

(21) Appl. No.: 12/760,870

(22) Filed: Apr. 15, 2010

(65) Prior Publication Data

US 2011/0255866 A1    Oct. 20, 2011

(51) Int. Cl.
H04B 10/00 (2006.01)
H04B 10/08 (2006.01)
H04J 14/00 (2006.01)
H04J 14/02 (2006.01)

(52) U.S. Cl. ............... 398/72; 398/25; 398/33; 398/38; 398/94; 398/160

(58) Field of Classification Search .......... 398/25, 398/33, 38, 58, 66, 67, 69–72, 94, 158, 160, 398/165, 168
See application file for complete search history.

(56) References Cited

U.S. PATENT DOCUMENTS

| | | | | |
|---|---|---|---|---|
| 7,301,970 | B2 * | 11/2007 | Kim et al. | 370/535 |
| 7,630,639 | B2 * | 12/2009 | Kramer et al. | 398/72 |
| 7,697,844 | B2 * | 4/2010 | Guo et al. | 398/69 |
| 2007/0140689 | A1 * | 6/2007 | Haran | 398/27 |
| 2007/0201867 | A1 * | 8/2007 | DeLew et al. | 398/38 |
| 2011/0129235 | A1 * | 6/2011 | Le et al. | 398/208 |
| 2011/0200328 | A1 * | 8/2011 | In De Betou et al. | 398/38 |

FOREIGN PATENT DOCUMENTS

| | | |
|---|---|---|
| EP | 1791275 A1 | 5/2007 |
| EP | 1793514 A1 | 6/2007 |
| JP | 11136216 A * | 5/1999 |
| WO | 2010028668 A1 | 3/2010 |

OTHER PUBLICATIONS

PCT International Search Report for PCT Application No. PCT/US2011/031073, dated Jul. 28, 2011, 10 pages.

* cited by examiner

*Primary Examiner* — Dalzid Singh (74) *Attorney, Agent, or Firm* — Garlick & Markison (57) ABSTRACT

A signal strength corresponding to an incoming optical burst from each of a plurality of optical nodes is measured. The measurements can be performed at system start-up, configuration/installation of the optical nodes and/or at certain intervals of operation of the optical nodes. Signal strength information for the optical nodes based on the measurements is stored in memory. When scheduling the optical nodes for transmission, a preferred transmission order is determined in response to the stored signal strength information. In an embodiment, the preferred order is determined to reduce differences in signal strength levels between consecutive optical bursts.

19 Claims, 7 Drawing Sheets

SYSTEM AND METHOD FOR SCHEDULING TIMESLOTS FOR TRANSMISSION BY OPTICAL NODES IN AN OPTICAL NETWORK

CROSS-REFERENCE TO RELATED PATENTS

Not applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates to optical networks and in particular to systems and methods for scheduling of transmission by optical nodes in a passive optical network.

2. Description of Related Art

Access networks provide connectivity from a network user to an edge of a network. Different types of access networks include digital subscriber line, hybrid fiber coax (HFC) and more recently fiber to the home. Fiber to the home generally employs a passive optical network (PON) with optical network units (ONUs) installed at network users' premises coupled to an optical line terminal (OLT) at a central office or network provider.

Passive Optical Networks include various protocols, including ATM-PON (APON), Broadband PON (BPON), Ethernet-PON (EPON) and Gigabit-PON (GPON). APON is based on an ATM protocol while BPON protocol is based on APON with added support for WDM and other features. EPON is described in IEEE 802.3 Carrier Sense Multiple Access with Collision Detection (CMSA/CD) Access Method and Physical Layer Specifications. EPON utilizes internet protocol (IP) having variable-length Ethernet frames. GPON is described in ITU-T G.984 Gigabit-capable passive optical networks (GPON) standard and supports ATM, IP and Time Division Multiplexed (TDM) protocols (such as SONET and SDH) with a choice of ATM, Ethernet and GPON encapsulation method (GEM) frames. With demand for greater bandwidth by network users, PON protocols are migrating to support increased data speeds. EPON protocols require 1 Gb/s data rate while current GPON standards require a rate up to 2.5 Gb/s. In addition, 10 Gigabit Ethernet PON (10G-EPON) is an emerging standard in IEEE 802.3av requiring an operating rate of 10 Gb/s. Additional PON technologies, such as WDM-PON, are also being developed.

Due to the topology of a PON, the transmission modes for downstream (i.e., from OLT to ONU) and upstream (i.e., from ONU to OLT) are different. In the downstream direction, the OLT broadcasts an optical signal in a 1×N nature to ONUs in a continuous mode (CM). The ONUs extract data frames which are addressed to their destinations from the optical signal. In the upstream direction, the optical signals transmitted by the ONUs are converged into one fiber or channel by an optical coupler such that the ONUs must share upstream channel capacity. To avoid collision and promote bandwidth sharing, ONUs asynchronously transmit in optical bursts during allocated time slots. Since the distances between the OLT and ONUs are not uniform, the phases of the optical bursts received by the OLT differ from packet to packet, and the optical bursts received by the OLT have different power levels. In some applications, a range of approximately 20 decibels (dB) have been observed. For example, in ITU-T recommendation G.984.2 a 15 dB differential optical path loss is defined. In the same standard the maximum variation of the mean launched power of the upstream transmitter is defined as 5 dB. These two numbers together lead to a maximum power difference of 20 dB at the upstream receiver. This difference in power levels creates problems for optical receivers in the OLT.

As such, there is a need to compensate for the variation between received optical bursts in an optical line terminal of a passive optical network.

DETAILED DESCRIPTION OF THE INVENTION

Figure 1:
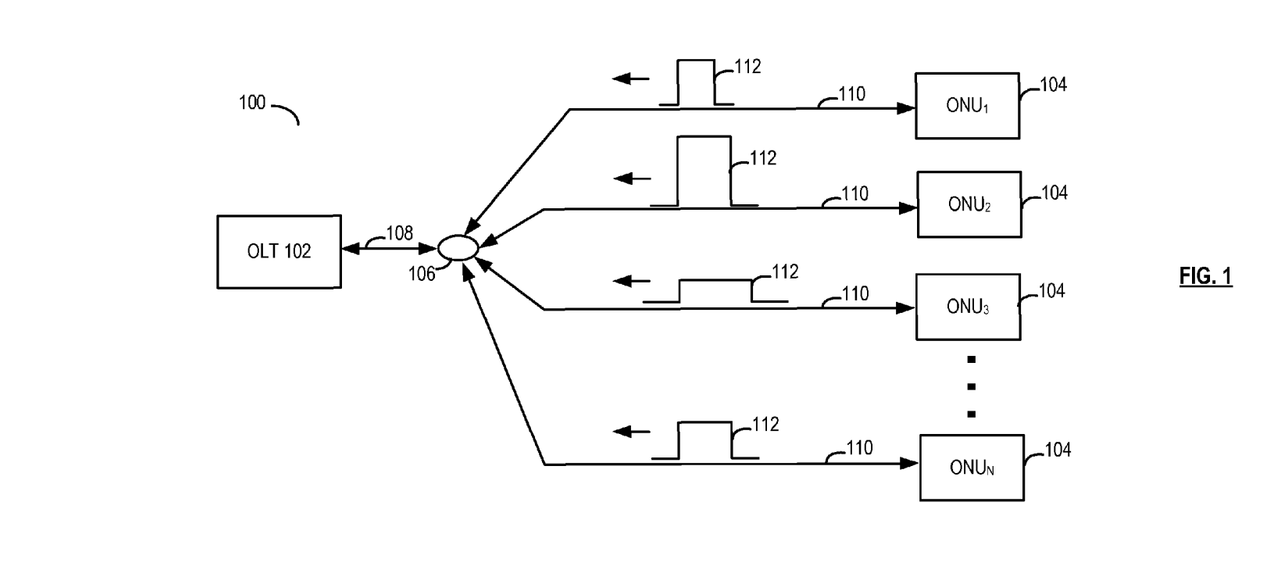
FIG. 1 illustrates a schematic block diagram of an embodiment of a passive optical network.

FIG. 1 illustrates a schematic block diagram of an embodiment of a passive optical network (PON) 100. The PON 100 includes an optical line termination module (OLT) 102 and a plurality of optical network units (ONUs) 104. The OLT 102 is coupled to an optical coupler module 106 by an optical link 108. The optical coupler module 106 splits the optical link 108 into 1×N access links 110. In an embodiment, the optical coupler includes a passive beam splitter/coupler or one or more cascaded beam splitters/couplers.

In general, the OLT 102 is located at a central office or network provider and couples the PON 100 to a metro network or wide area network, such as a broadcasting network, Internet, or time division multiplexed (TDM) network. In an embodiment, an internet service provider or local exchange carrier or other service provider provides broadband communication services to network users over the PON 100, such as voice, video and data services. The PON 100 can implement a standardized communication technology, such as APON, BPON, EPON, GPON and 10G-EPON standards.

In general, the ONUs 104 are located at a network user premises or in close proximity thereto, such as at a curb or central building location and are connected to an end user terminal or end user network. The ONUs 104 can include optical network terminals (ONTs) and other optical nodes that transmit optical bursts or optical packets.

In operation, the OLT 102 broadcasts an optical data signal downstream onto the optical link 108. The optical coupler module 106 splits the broadcast optical signal onto the access links 110. Since the optical coupler module 106 performs no switching, the optical signal is broadcast to all ONUs 104 served by the optical coupler module 106. It is therefore up to the ONUs 104 to filter out any signals intended for their destination. Each ONU 104 recovers data frames from the broadcast optical signal and determines which data frames are addressed to their respective end users. Only the data frames addressed to the end users of the ONU 104 are further processed while the remaining data frames are discarded. Since the downstream bandwidth to a given ONU 104 may vary over time, the ONUs 104 preferably should be able to process data frames in arbitrary downstream time slots, both in time and in size.

In the upstream direction, the ONUs 104 transmit optical signals to the optical coupler module 106 which then combines the optical signals onto optical link 108. Since the ONUs 104 share the optical link 108, scheduling methods must be employed to avoid packet collisions and promote bandwidth sharing among the ONUs 104. In an embodiment, the ONUs 104 are each assigned a predetermined timeslot for transmission. When an ONU 104 has no data to transmit, the predetermined timeslot for the ONU 104 remains empty or idle. In another embodiment, when an ONU 104 has data to transmit, it requests a transmission timeslot from the OLT 102. The OLT 102 schedules a timeslot for the ONU 104 and transmits a grant message to the ONU 104 with the designated start time and duration of the timeslot.

When determining bandwidth allocation, various factors are considered by the OLT 102. For example, some types of traffic, such as voice traffic, require a more constant upstream bandwidth. So for voice traffic, the OLT 102 may provide a fixed bandwidth allocation to the ONU 104. In addition, some classes of data service (such as DS1) may also require a relatively constant upstream bit rate. However, other types of data traffic—such as internet access—may require a variable upstream bit rate.

In an embodiment, the OLT 102 performs dynamic bandwidth allocation (DBA) amongst the ONUs 104 using one or more traffic scheduling concepts. For example, in GPON standards, two types of dynamic bandwidth allocation are described, status-reporting and non-status reporting. In non-status reporting DBA, the OLT 102 continuously allocates a small amount of extra bandwidth to each ONU 104. When the ONU 104 has no traffic to send, it transmits idle frames during its allocated timeslots. Conversely, when the ONU 104 has traffic to send, it transmits data frames during its allocated timeslots. When the OLT 102 observes that an ONU 104 is transmitting data frames, rather than idle frames, during its extra allocated timeslots, it increases the bandwidth allocation to that ONU. When the OLT 102 observes that a particular ONU is transmitting idle frames, the OLT 102 reduces the bandwidth allocated to that particular ONU. In status-reporting DBA, the OLT 102 polls an ONU 104 requesting information on data queues or buffers. The ONU 104 transmits a report message that includes a measure of the different traffic queues. In consideration of a service level agreement for the types of traffic and queues for such traffic in the ONUs 104, the OLT 102 determines how to allocate the spare timeslots across the ONUs 104.

In another example, EPON protocols implement a DBA mechanism similar to a status-reporting DBA mechanism. The OLT 102 polls ONUs 104 for their queue status and grants bandwidth in response thereto. Other DBA methods may be implemented herein as well.

After the OLT 102 schedules the timeslots, ONUs 104 then transmit optical bursts to the OLT 102 during their scheduled timeslots. The OLT 102 receives the various optical bursts from the ONUs 104. However, due to varying distances between the ONUs 104 and OLT 102 as described herein, the optical bursts detected by the OLT 102 have different power levels across timeslots.

In the illustrative example of FIG. 1, the optical bursts 112 from different ONUs 104 have varying signal strengths. This variation forces the OLT 102 to adjust its optical receiver at each timeslot to compensate for the varying optical powers. Without such an adjustment, an OLT 102 may wrongly interpret a "one" as a "zero" in a weak signal or interpret a "zero" as a "one" in a strong signal. This adjustment period occurs at the beginning of each optical burst and is sometimes called the automatic gain control (AGC) period. During the AGC period, the OLT 102 adjusts a gain factor of the input amplifiers in response to a signal strength of the input signals. In an embodiment, an automatic gain controller forms a feedback loop to continuously adjust a gain of an amplifier, generally a transimpedance amplifier, to a predetermined signal strength. Other adjustments may also need to be made at the beginning of a timeslot, such as a clock and data recovery (CDR) function to perform frequency adjustments for clock recovery and bit synchronization. The total period needed for adjustment is referred to as the settling time of the receiver. As required data bit rates increase, the optical receiver must obtain a high dynamic range within a shorter settling time (e.g., within 40 ns for GPON).

Figure 2:
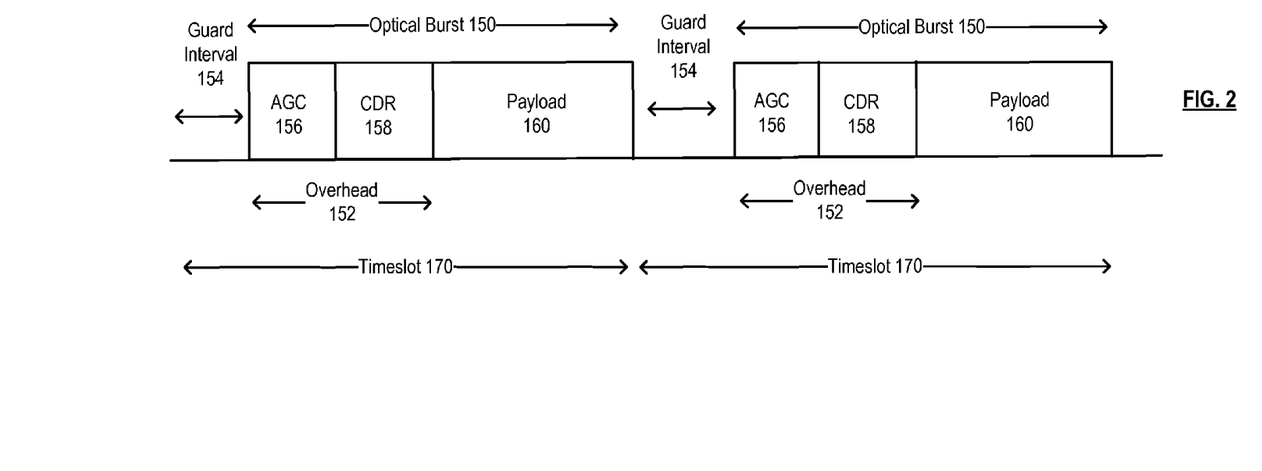
FIG. 2 illustrates a schematic block diagram of an embodiment of a frame structure for an optical burst in a passive optical network.

FIG. 2 illustrates a schematic block diagram of an embodiment of a frame structure for an optical burst 150. The optical burst 150 is transmitted in timeslot 170. A guard interval 152 is sometimes required between optical bursts 150. The optical burst frame includes overhead 152 and payload 160. In an embodiment, the overhead 152 includes an AGC bit sequence 156 and a CDR bit sequence 158. The AGC and CDR bit sequences provide bit sequences for the automatic gain and clock and data recovery processes during the settling time of the OLT 102. As data rates increase, the settling time of the optical receiver needs to be sufficiently fast to avoid increasing the required overhead of the AGC and CDR bit sequences. In addition, a reduction of the required AGC period of an optical receiver can lead to less overhead and increased data rates.

FIG. 3 illustrates a schematic block diagram of an embodiment of optical burst scheduling in PON 100. In an embodiment, the ONUs 104 transmit optical bursts 150 in different scheduled timeslots 170. In the embodiment in FIG. 3, the optical bursts vary in duration though the optical bursts may have a fixed duration in other embodiments. As seen in FIG. 3a, the ONUs 104 are typically scheduled to transmit without considering a signal strength of their optical bursts. However, such scheduling results in a wide variance of signal strengths between consecutive optical bursts 150 and as such require longer settling times for the optical receiver.

Figure 3A:
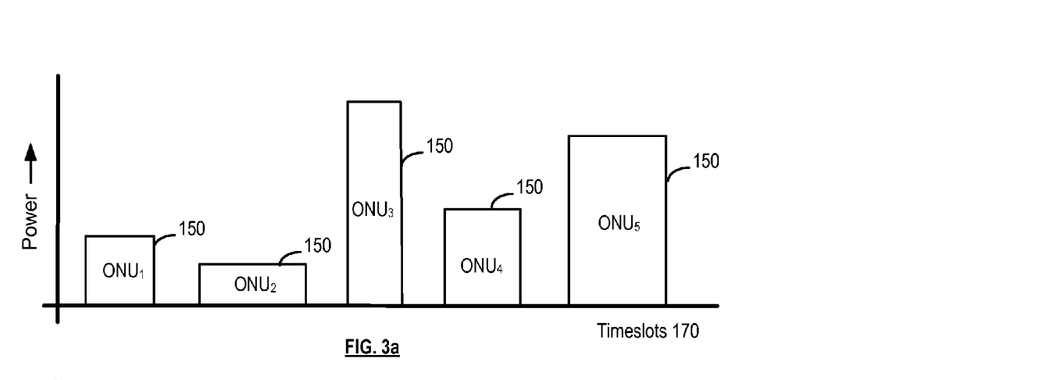
FIGS. 3a-f illustrate schematic block diagrams of embodiments of optical burst scheduling in a passive optical network.
Figure 3B:
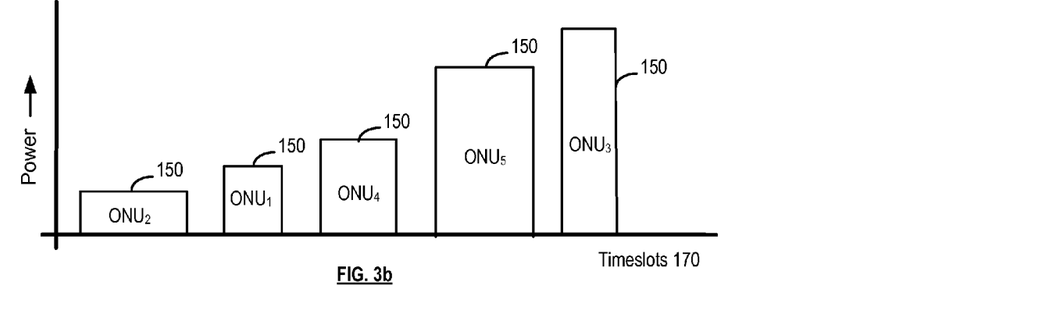

In an embodiment shown in FIG. 3b, the ONUs 104 are scheduled to transmit optical bursts 150 based on an associated signal strength of optical bursts from the ONUs 104. Either at start up, such as at the time of configuration of an ONU 104 or periodically during operation, a signal strength of one or more optical bursts from an ONU is measured, and signal strength information is stored at the OLT 102. The signal strength may include an amplitude value, such as in voltage or amps, or power level. It may include average or mean measurements over a period of time, or for a single optical burst. It may include the variance of power or the expected or standard deviation of power of optical bursts from an ONU. It may also include other designated values (such as a ranking) that indicate a relative power for optical bursts associated with the ONUs 104. As illustrated in FIG. 3b, when determining scheduling of the timeslots for transmission of the optical bursts to ONUs 104, one of the factors in determining the order of the timeslots is the signal strength information. In an embodiment, the OLT 102 assigns timeslots to the ONUs 04 to reduce differences in signal strength of consecutive optical bursts.

Figure 3C:
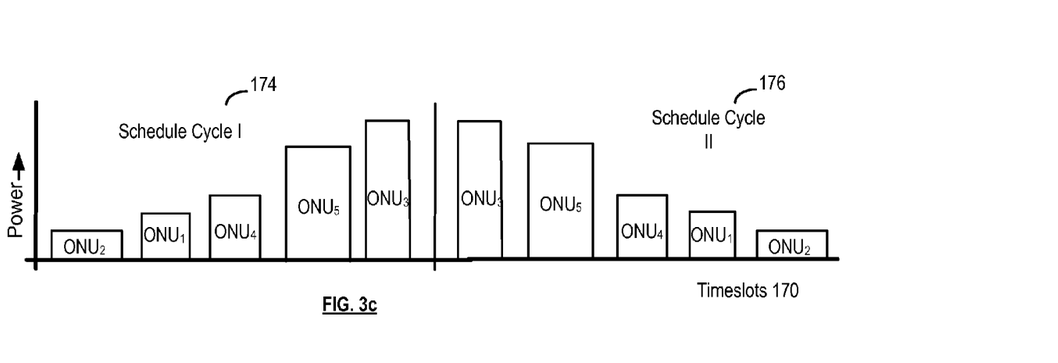

In another embodiment shown in FIG. 3c, the order of the scheduling in a first scheduling cycle 174 is reversed in the next scheduling cycle 176. The OLT 102 schedules the ONUs 104 to transmit in reverse order in alternate or consecutive scheduling cycles to reduce signal strength transition between two scheduling cycles 174 and 176. The signal strengths of optical bursts in the first scheduling cycle are in an approximately ascending order and are reversed to an approximately descending order in the next or consecutive scheduling cycle.

In an embodiment, one measure of signal strength of optical bursts is power. The OLT 102 determines the power of optical bursts from the ONUs 104 and then optimizes the schedule based on the power levels of optical bursts. For example, assuming optical bursts from $ONU_1$ are measured as having a power $P_1$ from $ONU_2$ having a power $P_2$, from $ONU_3$ having a power $P_3$, from $ONU_4$ having a power $P_4$ and $ONU_5$ having a power $P_5$. The difference between the power levels is determined, and the ONUs are scheduled based on the power levels $P_i$. For example, the timeslots are assigned to reduce the difference in consecutive power levels of the optical bursts, e.g. optical bursts with more similar or equal power levels are assigned in consecutive timeslots.

In another example, the gain rate of the AGC module is considered. For example, by scheduling the timeslots to minimize a difference in consecutive signal strengths, then the rate of the increase/decrease of the gain of the AGC module follows a more approximately linear trajectory in time. Thus, the optical bursts are optimally scheduled to avoid an AGC gain step steeper than the maximum defined by this line. More generally, for an arbitrary curve defining the maximum rate of increase or decrease of the gain of the AGC module in time, a schedule of optical bursts that does not require the AGC gain to change at a higher rate than the maximum defined for the particular operating point is optimal.

In another embodiment, the variance in signal strength of one or more ONUs 104 is considered when scheduling. For example, when an ONU 104 transmits optical bursts with a large variance of signal strength, it may be difficult to determine the optimal schedule for the ONU. As such, the ONU 104 may be scheduled at the end of a scheduling cycle or scheduled based on the mean signal strength and the variance.

Figure 3D:
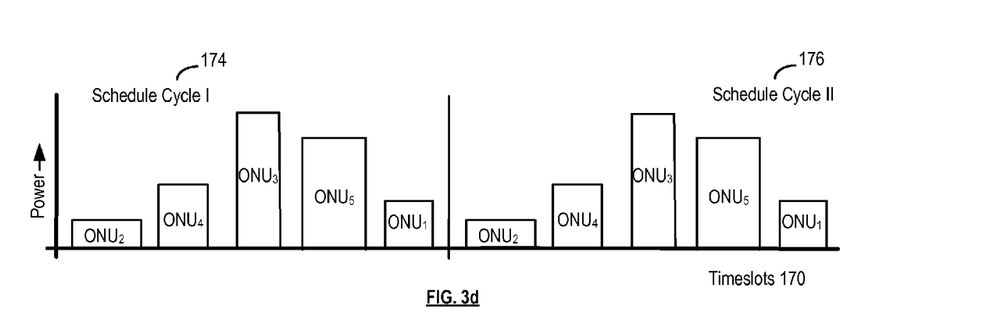

In the embodiment in FIG. 3c, due to the reversal of order between cycles, the inter-arrival time of optical bursts for an ONU 104 varies. In an alternative embodiment shown in FIG. 3d, the timeslots are ordered to provide ascending and descending signal strength levels of optical bursts in a scheduling cycle. The optical bursts in the first and last timeslots have relatively lower signal strength while optical bursts with relatively higher signal strength are scheduled in approximately the middle of the cycle. This allows a concatenation of scheduling cycles without the need to reverse the order. For example, as shown in FIG. 3d, the nodes are assigned timeslots in an order of $ONU_2$, $ONU_4$, $ONU_3$, $ONU_5$ and $ONU_1$. The optical nodes may also be scheduled in a reverse order thereto. Alternatively, the optical nodes may be scheduled as $ONU_2$, $ONU_5$, $ONU_3$, $ONU_4$ and $ONU_1$ or in reverse order thereto. This scheduling method of ascending and descending signal strength levels may be a more fair allocation of timeslots since the ONUs have a similar order in each cycle.

Figure 3E:
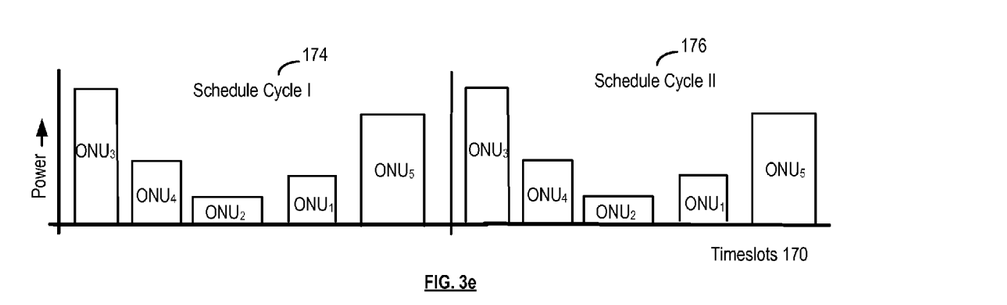

FIG. 3e illustrates an embodiment wherein the timeslots 170 are ordered to provide approximately descending and then approximately ascending signal strength levels of optical bursts in a scheduling cycle 174. Similar to the example in FIG. 3d, this allows a concatenation of scheduling cycles without the need to reverse an order of timeslots. The optical bursts in the first and last timeslots have relatively higher signal strength while optical bursts with relatively lower signal strength are scheduled in approximately the middle of the cycle. For example, in FIG. 3e, the nodes are assigned timeslots in an order of $ONU_3$, $ONU_4$, $ONU_2$, $ONU_1$ and $ONU_5$. The optical nodes may also be scheduled in a reverse order thereto. Alternatively, the optical nodes may be scheduled as $ONU_3$, $ONU_1$, $ONU_2$, $ONU_4$ and $ONU_5$ or in reverse order thereto.

Figure 3F:
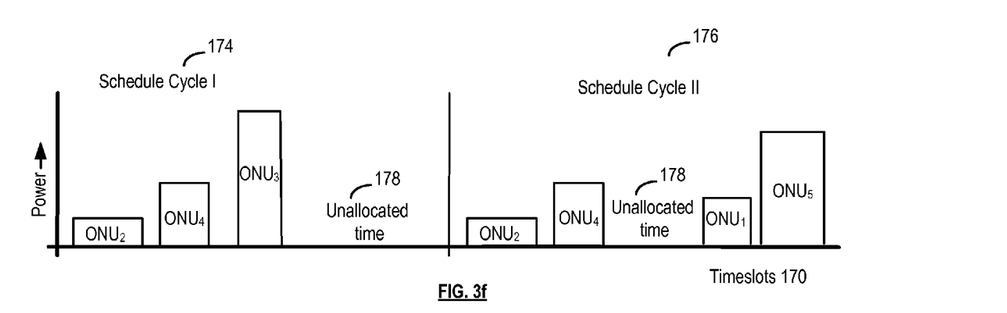

FIG. 3f illustrates an embodiment wherein unallocated timeslots are scheduled. The OLT 102 may schedule long periods of unallocated time 178 within a scheduling cycle, after a scheduling cycle or between scheduling cycles. The unallocated time is scheduled, for example, to reduce PON energy consumption during low traffic periods or to launch discovery or ranging cycles. The unallocated time 178 may correspond to a partial frame period or an entire frame period or multiple frame periods. During unallocated time 178, the OLT generally sets a maximum gain at the AGC. Thus, to reduce settling time of the AGC, in an embodiment, an optical burst with a relatively lower signal strength is scheduled after unallocated time 178. Though in another embodiment, if the AGC is set at a mid level gain, then another optical burst with an approximately average signal strength is scheduled after unallocated time 178.

Though only five timeslots in scheduling cycles 174, 176 are illustrated in FIGS. 3a-f, it is understood that more optical bursts in additional timeslots may be scheduled within a cycle. For example, in some current standards, over 4000 timeslots are present in a scheduling cycle, e.g. ITU-T 984.3 allows up to 4095 timeslots during a 125 microsecond frame period. With an increased number of optical bursts, a more gradual transition or slope between signal strength levels of optical bursts can be obtained for a cycle.

The scheduling cycles 174 and 176 shown in FIGS. 3b-e may include one or more frame periods or partial frame periods. For example, in one embodiment, each scheduling cycle 174 and 176 corresponds to a frame period. In another example, the OLT 102 may assign two or more timeslots to ONUs within one frame period. Thus, the ordering of ONUs in scheduling cycles 174 and 176 are repeated one or more times within one frame period. In another embodiment, the scheduling cycles 174 and 176 include multiple frame periods. For example, one frame period may not be sufficiently long to schedule the required number of ONUs in a scheduling cycle 174, 176. Then, the scheduling cycle 174 may include, e.g. three frame periods and scheduling cycle 176 includes three more frame periods. In another embodiment, the scheduling cycles 174, 176 include partial frame periods, such as one and half frame periods are needed for the ordering of the optical bursts in scheduling cycle 174 and then another one and half frame periods for scheduling cycle 176. Thus, the scheduling cycles 174, 176 may correspond to multiple frame periods or to partial frame periods.

The scheduling of timeslots shown in FIGS. 3b through 3f illustrate several patterns of scheduling ONUs based on signal strength measurements to reduce settling time of an optical receiver. By scheduling transmission of optical nodes to reduce consecutive signal strengths of optical bursts within a scheduling cycle, the automatic gain controller has less transition between optical bursts, thus decreasing overall settling time. In addition, other patterns or ordering of optical bursts based on signal strength than those shown in FIGS. 3b through 3f may be beneficial in reducing settling time depending on the implementation of the optical receiver and signal strength measurements of the ONUs.

Figure 4:
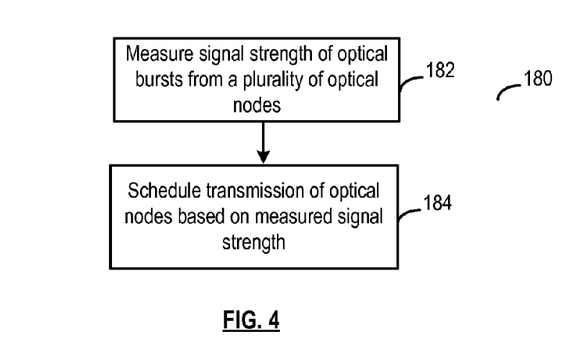
FIG. 4 illustrates a logic flow diagram of an embodiment of a method for scheduling transmission of optical nodes in an optical network.

FIG. 4 illustrates a logic flow diagram of an embodiment of a method 180 for scheduling transmission of optical nodes in an optical network. In step 182, signal strength of optical bursts or optical packets from a plurality of optical nodes is measured and signal strength information is stored in a memory. The optical nodes include optical network terminals, optical network units, or other optical nodes that transmit optical bursts or packets. Signal strength is measured at configuration or start up, and in addition, the signal strength is measured during normal operations periodically, or upon request, to determine any variations over time. In step 184, the timeslots for transmission are assigned to the optical nodes based on the associated signal strength information stored in memory.

Figure 5:
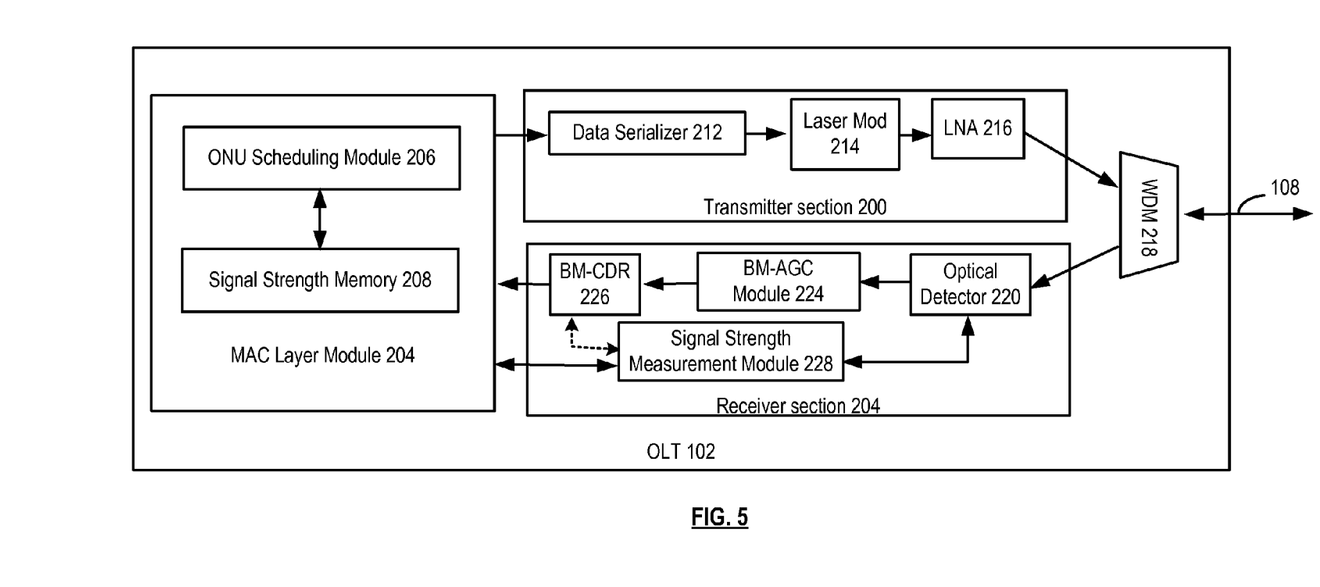
FIG. 5 illustrates a schematic block diagram of an embodiment of an optical line terminal.

FIG. 5 illustrates a schematic block diagram of an embodiment of an optical line terminal 102. Though an optical line terminal in a PON 102 is described herein, similar embodiments can be implemented in other types of optical nodes that receive optical packets or bursts in various types of optical networks. The OLT 102 includes a transmitter section 200, a receiver section 202 and a media access control (MAC) layer module 204. The MAC layer module 204 performs various layer 2 (L2) functions, for example addressing, network processing, traffic management and packet framing. The MAC layer module 204 includes one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The MAC layer module 204 includes a memory that is an internal memory or an external memory. The memory of the MAC layer module 204 may be a single memory device or a plurality of memory devices. Such a memory device may be a read-only memory, random access memory, volatile memory, non-volatile memory, static memory, dynamic memory, flash memory, cache memory, and/or any device that stores digital information. The MAC layer module 204 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The MAC layer module 204 may execute hard-coded and/or software and/or operational instructions stored by the internal memory and/or external memory to perform the steps and/or functions described herein. The MAC layer module 204 may be implemented in a single or in one or more integrated circuits.

When the OLT 102 generates a packet frame destined to an ONU 104, it inserts a MAC address corresponding to the ONU 104. Although the frame is broadcast through the PON 100 to every ONU 104, only the ONUs 104s with a matching MAC address accepts the frame and passes it to its own MAC layer for further processing. The MAC layer parses the frame and inspects the frame header and discards the contents when it is not intended for the ONU. For upstream traffic, each ONU 104 inserts its MAC address in the preamble of a transmitted frame for identification of the source by the MAC layer module 204 of the OLT 102.

The MAC layer module 204 includes a scheduling module 206 that schedules transmission of, e.g. assigns timeslots to, the ONUs 104 coupled to the OLT 102. The MAC layer module is coupled to a signal strength memory 208. The signal strength memory 208 is an internal or external memory that stores information on power measurements of optical bursts from ONUs 104. The memory 208 may be a single memory device or a plurality of memory devices. The memory device may be a read-only memory, random access memory, volatile memory, non-volatile memory, static memory, dynamic memory, flash memory, cache memory, and/or any device that stores digital information.

In operation, the OLT 102 generates data frames and transmits the data frames to data serializer 212 in transmitter section 200. Data serializer 212 formats the data frames into a sequence of binary data bits for continuous mode transmission. The laser module 214 modulates a laser based on the data bits to generate an optical signal. An optional amplifier 216 amplifies the optical signal and passes the amplified optical signal to wavelength division multiplexer (WDM) 218. WDM 218 passes the signal downstream onto the optical link 108.

In the upstream direction, WDM 218 passes the optical signals from the ONUs 104 to receiver section 204. Optical detector 220 detects the incoming optical bursts and converts the optical signals into electrical signals. In order to compensate for the phase variation and amplitude variation of the optical bursts, a burst mode automatic gain control (AGC) module 224 and burst mode clock and data recovery (BM-CDR) module 226 are implemented in the receiver section 204. Based on the signal strength of the incoming signal, the burst mode AGC module 224 adjusts the gain of the incoming signal to a predetermined voltage level or range. The clock and data recovery section 226 receives the adjusted electrical signal from burst mode AGC module 224 and extracts binary data.

The signal strength measurement module 228 measures a signal strength associated with an incoming optical burst. In an embodiment, the signal strength measurement module 228 interfaces with the optical detector 220 and measures a signal strength of the optical burst or the converted electrical signal of the optical burst. In another embodiment, signal strength measurement module 228 interfaces with BM-CDR module 226, as shown in a dotted line in FIG. 5, and estimates a signal strength based on bit widths, as explained in more detail with respect to FIG. 10b. Other implementations of measuring signal strength are possible as well. Signal strength information of optical bursts is then stored in signal strength memory 208. The scheduling module 206 schedules transmission of the ONUs 104 coupled to the OLT 102 in response to the signal strength information.

Figure 6:
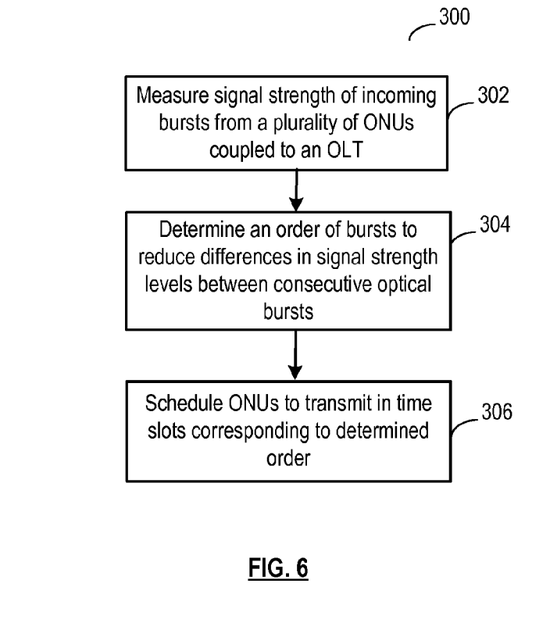
FIG. 6 illustrates a logic flow diagram of an embodiment of a method for scheduling transmission of optical nodes in an optical network.

FIG. 6 illustrates a logic flow diagram of an embodiment of a method 300 for scheduling transmission of optical nodes in an optical network. In step 302, the signal strength of an incoming optical burst is measured for a plurality of ONUs 104. Signal strength information for the ONUs 104 based on the signal strength measurements is stored in memory. When scheduling ONUs 104 for transmission, a preferred transmission order is determined in response to the stored signal strength information, in step 304. In an embodiment, the preferred order is determined that reduces differences in signal strengths between consecutive optical bursts. In an embodiment, the signal strengths of optical bursts in a first cycle are in an approximately ascending order and are reversed to an approximately descending order in a consecutive cycle, as described with respect to FIG. 3c. In another embodiment, the signal strengths of optical bursts are in an approximately ascending and descending order of signal strength levels, as described with respect to FIG. 3d. In another embodiment, the signal strengths of optical bursts are in an approximately descending order and then an ascending order of signal strength levels, as described with respect to FIG. 3e. In other embodiments, additional or different orders of optical burst signal strength levels may be determined that optimizes differences in signal strength between consecutive optical bursts for that embodiment. The ONUs 104 are then scheduled to transmit in time slots corresponding to the determined order in a first scheduling cycle in step 306.

Figure 7:
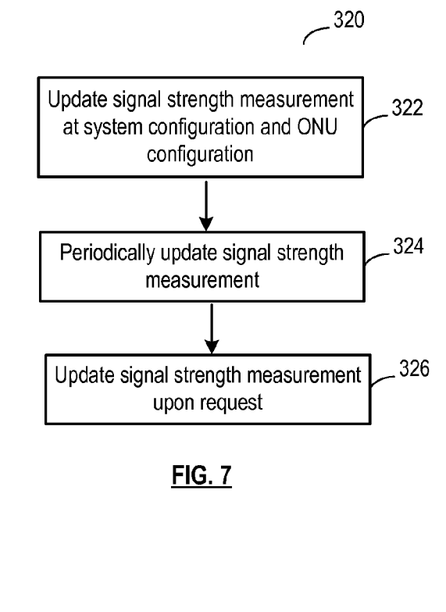
FIG. 7 illustrates a logic flow diagram of an embodiment of a method for measuring signal strength of optical bursts.

FIG. 7 illustrates a logic flow diagram of an embodiment of a method 320 for measuring signal strength of optical bursts. In step 322, signal strength of one or more incoming bursts for each of a plurality of ONUs 104 coupled to an OLT 102 is measured. The measurements are performed at system start-up or at configuration/installation of a new ONU 104 in the passive optical network. In step 324, the signal strength measurements are updated periodically. The OLT 102 may set a predetermined interval or period for updating signal strength measurements for an ONU 104. The predetermined interval may vary over time or may vary per ONU 104. In practical implementation, the scheduling module 206 requires multiple frame periods to compute a new schedule based on signal strength information and, for example, on one or more of DBA information, bandwidth limits, quality of service (QoS), service level agreement (SLA) etc. Since scheduling typically cannot be performed on a frame by frame basis, it is performed at a schedule update rate. As such, the signal strength measurements may also be performed periodically prior to determining a new schedule and at a similar or multiple of the schedule update rate.

In step 326, the signal strength measurements are updated upon request. For example, the OLT 102 may request the signal strength measurement module to measure optical bursts from a particular ONU 104, for example, when a high bit rate error or difficulty detecting a signal from an ONU 104 occurs.

Figure 8:
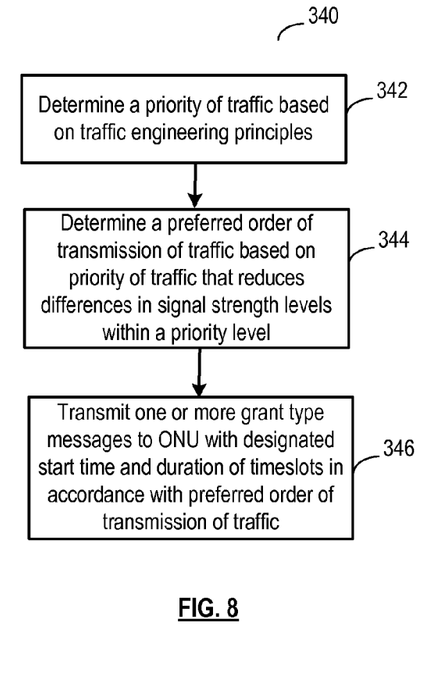
FIG. 8 illustrates a logic flow diagram of an embodiment of a method for scheduling transmission of optical nodes in an optical network.

FIG. 8 illustrates a logic flow diagram of an embodiment of a method 340 for scheduling transmission of optical nodes in an optical network. In an embodiment, other factors may be taken into consideration when determining the preferred order of transmission of the ONUs 104. As explained above, certain dynamic bandwidth allocation techniques may also be considered. For example, certain types of traffic such as voice may be given priority in scheduling. The higher priority traffic may be scheduled first in an order to reduce differences in signal strength levels between higher priority consecutive optical bursts. Then lower priority traffic is scheduled next in an order to reduce differences in signal strength levels between lower priority consecutive optical bursts. Other traffic engineering principles, such as bandwidth requirements of an ONU, service level agreements, fairness, etc. are also considered when determining scheduling of optical bursts. Another factor to consider is when a single ONU requests multiple timeslots in a scheduling cycle. The timeslots may be ordered consecutively or consolidated within one optical burst. Alternatively, the timeslots may also be separated for bandwidth fairness even though the power levels are the same. In step 342 of FIG. 8, a priority of traffic based on traffic engineering principles is determined. A preferred order of transmission of ONU traffic is then determined in step 344 based on a priority of traffic and signal strength levels within a priority level. Then one or more grant type messages are transmitted to one or more ONUs 104 with designated start time and duration of assigned timeslots in accordance with the preferred order of transmission.

Figure 9A:
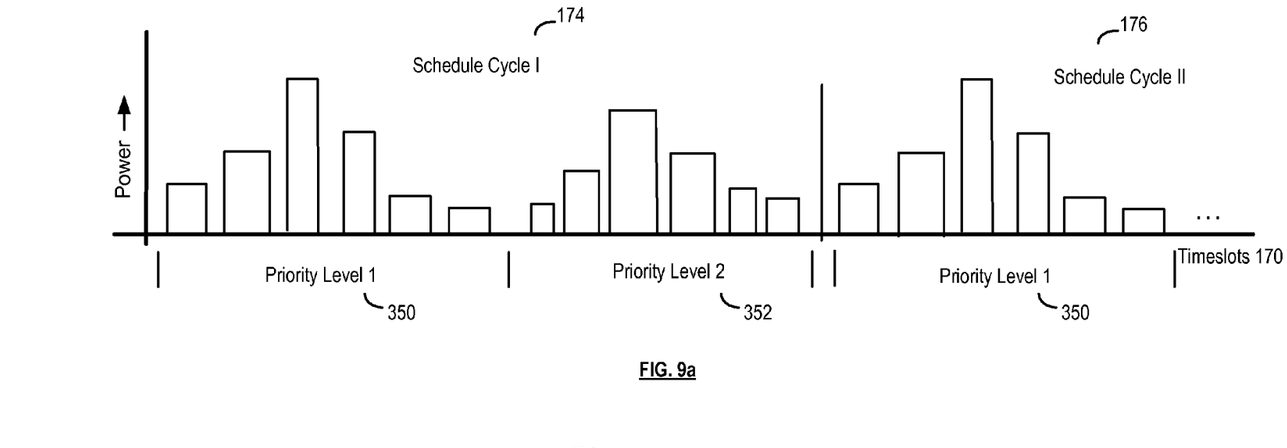
FIGS. 9a and 9b illustrate a schematic block diagram of another embodiment for optical burst scheduling in a passive optical network.
Figure 9B:
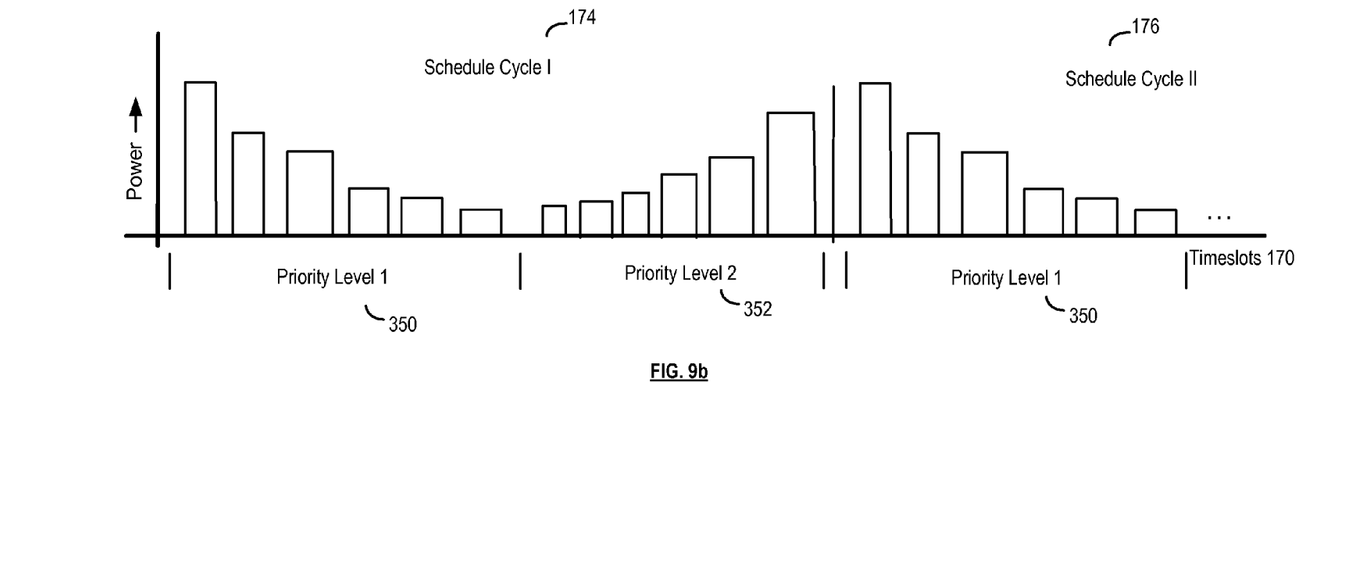

FIGS. 9a and 9b illustrate a schematic block diagram of an embodiment for optical burst scheduling based on a priority of traffic and optimizing differences in signal strength levels in consecutive optical bursts within a priority level. Though two priority levels 350 and 352 are illustrated in FIGS. 9a and 9b, additional priority levels may be included as well. In an embodiment in FIG. 9a, the optical bursts in each priority level 350, 352 are ordered in accordance with approximately ascending and descending signal strength levels. In another embodiment, the optical bursts in each priority level 350, 352 may be ordered in accordance with approximately descending and ascending signal strength levels.

In another embodiment in FIG. 9b, the optical bursts in a first priority level 350 are ordered in accordance with approximately descending signal strength levels and are ordered in a second priority level in accordance with approximately an ascending signal strength level. This order also allows a concatenation of scheduling cycles without the need to reverse an order of timeslots.

Figure 10A:
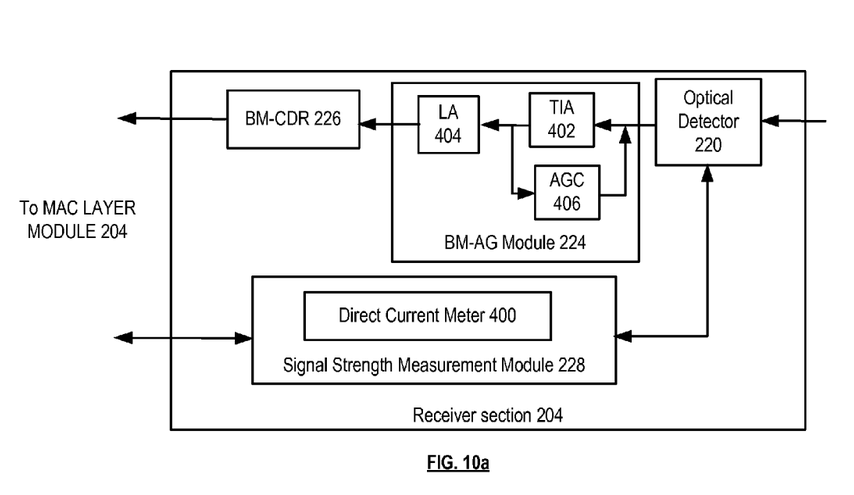
FIGS. 10a and 10b illustrate schematic block diagrams of embodiments of an optical receiver for receiving optical bursts.

FIG. 10a illustrates a schematic block diagram of an embodiment of an optical receiver for receiving optical bursts. The receiver 204 includes an optical detector 220, burst mode automatic gain controller module 224 and burst mode clock and data recovery module 226. The burst mode automatic gain control module 224 includes a transimpedance amplifier (TIA) 402, a limiting amplifier (LA) 404 and an automatic gain controller (AGC) 406. The AGC 406 provides a feedback loop to the TIA 402 to adjust the TIA output to a predetermined signal strength level or range. In addition, a signal strength measurement module 228 is coupled to the optical detector 220 and includes a direct current meter 400. The direct current meter 400 measures an average photocurrent or photoelectric current that flows through the optical detector 220. The signal strength measurements are transmitted to the MAC layer module 204. Though a direct current meter 400 is described herein, other embodiments for measuring signal strength of an incoming optical burst can be implemented.

Figure 10B:
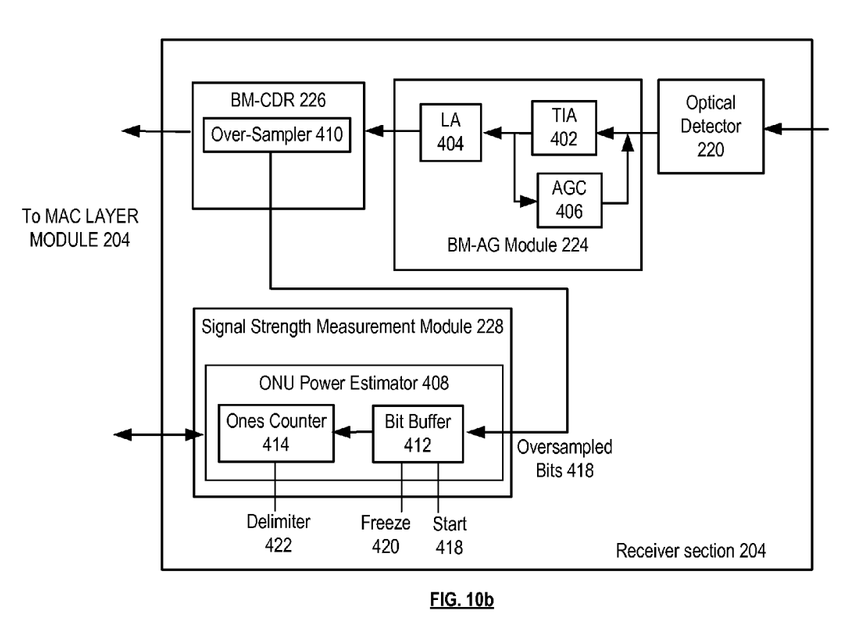

FIG. 10b illustrates a schematic block diagram of another embodiment of an optical receiver for receiving optical bursts. In FIG. 10b, the signal strength measurement module 228 includes an ONU Power Estimator 408. The ONU power estimator 408 interfaces with an over-sampler module 410 in BM-CDR module 226 and estimates a signal strength for an ONU based on bit widths, as described in US Patent Application No. 2009/0279886 which is incorporated by reference herein.

In operation, the oversampler module 410 samples a signal from the BM-AG module 224 at a frequency higher than a frequency of the input signal to produce an oversampled signal. During a preamble of the signal, the bit buffer 412 stores oversampled bits 416 from over-sampler 419 in a fixed time window. A start pulse 418 initiates bit collection to start the fixed time period. The bit buffer stores certain preamble bits, corresponding with the length of the preamble, while dropping any previously stored bits. A delimiter detection detects the start frame delimiter (SFD) bits that mark the end of the preamble. It triggers a freeze pulse 418 causing the bit buffer 412 to hold the stored bits and stop acquiring new input bits. A delimiter signal 418 provides information to the ones counter 414 about the position of the beginning of the delimiter in the bit buffer 412. The ones counter 414 then counts all logic "ones" stored from the beginning of the buffer to the delimiter start position. By doing this, it is possible to distinguish optical transmit power levels of different ONUs. Due to bandwidth limitations of the analog electronics components TIA 402 and LA 404 in the BM-AG module 224, higher power of the optical signal results in a greater and longer lasting distortion of the preamble duty cycle. This distortion translates into a higher number of "ones" in the oversampled image of the preamble in the fixed time window preceding the delimiter detection.

The signal strength measurement modules in FIGS. 10a and 10b are two illustrative examples of implementations that may be used by the OLT 102. Other types of signal strength measurement modules and feedback may also be incorporated instead of or in addition to these example implementations. For example, feedback on a success rate for detecting, or an ease of detection, of optical bursts from an ONU 104 may also be determined by the BM-AG module 224 and BM-CDR 226. This feedback is provided to the ONU scheduling module 206 to determine a scheduling of timeslots in future scheduling cycles for the ONU 104. Other modules in the receiver section 204 may provide feedback as well. For example, a forward error correction (FEC) module may provide feedback on ease of detection and errors detected for an optical burst. This feedback is used by the ONU scheduling module 206 to optimize the scheduling of the ONUs 104.

The settling time of an optical receiver can be reduced by optimizing the scheduling of timeslots to reduce signal strength differences in consecutive optical bursts within a scheduling cycle and between scheduling cycles. By reducing the settling time, higher bit rates are possible without increasing the required AGC overhead of an optical burst frame. More of the frame can be dedicated to data and/or more frames can be transmitted which increases the possible throughput of the network.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "coupled to" and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method for scheduling optical bursts from a plurality of optical network units in a passive optical network, comprising:
   measuring signal strength of optical bursts from the plurality of optical network units;
   determining a priority level for traffic from the plurality of optical network units; and
   scheduling transmission of optical bursts from the plurality of optical network units based on the measured signal strengths, wherein the scheduling includes:
      scheduling transmission of the optical network units in a first scheduling cycle to reduce differences in consecutive signal strengths of the optical bursts and in response to the priority level for traffic from the plurality of optical network units; and
      scheduling transmission of the optical network units in a second scheduling cycle to reduce a difference in consecutive signal strengths of the optical bursts in the first scheduling cycle and the second scheduling cycle and in response to the priority level for traffic from the plurality of optical network units.

2. The method of claim 1, wherein scheduling transmission of optical bursts from the plurality of optical network units based on the measured signal strengths comprises:
   scheduling transmission by the optical network units to reduce signal strength differences between consecutive optical bursts.

3. The method of claim 1, wherein scheduling transmission of the optical network units in a first scheduling cycle to reduce differences in consecutive signal strengths of the optical bursts further comprises scheduling optical network units in a first order of signal strengths having a first priority level for traffic and scheduling transmission of the optical network units in a reverse order of signal strengths having a second priority level for traffic.

4. The method of claim 3, wherein scheduling transmission of the optical network units in the second scheduling cycle to reduce differences in consecutive signal strengths of the optical bursts further comprises scheduling optical network units in a first order of signal strengths having a first priority level for traffic and scheduling transmission of the optical network units in a reverse order of signal strengths having a second priority level for traffic.

5. The method of claim 1, wherein scheduling transmission of optical bursts from the plurality of optical network units based on the measured signal strengths comprises:
- scheduling transmission of the optical network units in a first scheduling cycle such that optical bursts have an approximately ascending and approximately descending signal strength level; and
- scheduling transmission of the optical network units in a second scheduling cycle in a same order.

6. The method of claim 1, wherein scheduling transmission of optical bursts from the plurality of optical network units based on the measured signal strengths comprises:
- receiving requests for transmission from the plurality of optical network units; and
- allocating a transmission timeslot for the plurality of optical network units requesting transmission to reduce differences in signal strengths of consecutive optical bursts.

7. The method of claim 1 wherein allocating a transmission timeslot for the plurality of optical network units comprises:
- allocating a first plurality of transmission timeslots for a first priority level of traffic in a first portion of the first scheduling cycle such that optical bursts have an approximately ascending and approximately descending signal strength level in the first plurality of transmission timeslots;
- allocating a plurality of transmission timeslots for at least a second priority level of traffic in a second portion of the first scheduling cycle such that optical bursts have an approximately ascending and approximately descending signal strength level in the second plurality of transmission timeslots;
- allocating a first plurality of transmission timeslots for a first priority level of traffic in a first portion of the second scheduling cycle such that optical bursts have an approximately ascending and approximately descending signal strength level in the first plurality of transmission timeslots and to reduce a difference in consecutive signal strengths of a last optical burst in the first scheduling cycle and a first optical burst in the second scheduling cycle;
- allocating a plurality of transmission timeslots for at least a second priority level of traffic in a second portion of the second scheduling cycle such that optical bursts have an approximately ascending and approximately descending signal strength level in the second plurality of transmission timeslots.

8. The method of claim 1, wherein measuring signal strength of optical bursts from the plurality of optical network units includes:
- determining a power level of optical bursts associated with each of the plurality of optical network units connected to an optical line termination; and
- storing the power levels of optical bursts associated with each of the plurality of optical network units in a memory of the optical line termination.

9. The method of claim 1, wherein allocating a transmission timeslot for the plurality of optical network units comprises:
- allocating a first plurality of transmission timeslots for a first priority level of traffic in a first portion of the first scheduling cycle such that optical bursts have an approximately descending signal strength level in the first plurality of transmission timeslots;
- allocating a plurality of transmission timeslots for at least a second priority level of traffic in a second portion of the first scheduling cycle such that optical bursts have an approximately ascending signal strength level in the second plurality of transmission timeslots;
- allocating a first plurality of transmission timeslots for a first priority level of traffic in a first portion of the second scheduling cycle such that optical bursts have an approximately descending signal strength level in the first plurality of transmission timeslots and to reduce a difference in consecutive signal strengths of a last optical burst in the first scheduling cycle and a first optical burst in the second scheduling cycle; and
- allocating a plurality of transmission timeslots for at least a second priority level of traffic in a second portion of the second scheduling cycle such that optical bursts have an approximately ascending signal strength level in the second plurality of transmission timeslots.

10. The method of claim 1, wherein scheduling transmission of the optical network units in a second scheduling cycle to reduce a difference in consecutive signal strengths of the optical bursts in the first scheduling cycle and the second scheduling cycle and in response to the priority level for traffic from the plurality of optical network units comprises:
- scheduling optical network units in a reverse order of signal strengths in a first priority level of the second scheduling cycle than in an order of signal strengths in a last priority level of the first scheduling cycle.

11. The method of claim 1, wherein scheduling transmission of the optical network units in a first scheduling cycle to reduce differences in consecutive signal strengths of the optical bursts and in response to the priority level for traffic from the plurality of optical network units comprises:
- scheduling transmission of the optical network units according to one or more priority levels and within each of the one or more priority levels, scheduling transmission of the optical network units according to an approximately ascending and descending signal strengths; and wherein scheduling transmission of the optical network units in a second scheduling cycle to reduce a difference in consecutive signal strengths of the optical bursts in the first scheduling cycle and the second scheduling cycle and in response to the priority level for traffic from the plurality of optical network units comprises:
- scheduling transmission of the optical network units according to one or more priority levels and within each of the one or more priority levels, scheduling transmission of the optical network units according to an approximately ascending and descending signal strengths.

12. An optical receiver, comprising:
- a media access control (MAC) module that includes:
  - a scheduling module operable to allocate transmission timeslots to a plurality of optical nodes based on signal strength information associated with optical bursts from the plurality of optical nodes; and
  - a memory for storing the signal strength information associated with the optical bursts from the plurality of optical nodes;
- a signal strength measurement module for measuring signal strength of received optical bursts;

an optical detector module operable to receive an optical burst and convert the optical burst into an electrical signal;

an amplifier module with automatic gain control operable to adjust a gain based on a signal strength of the optical burst; and a clock and data recovery module coupled to the MAC module operable to convert the electrical signal into binary data and provide the binary data to the MAC module.

13. The optical receiver of claim 12, wherein the scheduling module is further operable to schedule transmission by the optical nodes to reduce differences in consecutive signal strength levels associated with optical bursts from the plurality of optical nodes.

14. The optical receiver of claim 13, wherein the scheduling module is further operable to schedule transmission of the optical nodes in a first scheduling cycle such that optical bursts have an approximately ascending signal strength level and to schedule transmission of the optical nodes in reverse order in a second scheduling cycle such that optical bursts have an approximately descending signal strength level.

15. The optical receiver of claim 13, wherein the scheduling module is further operable to schedule transmission of the optical nodes in a first scheduling cycle such that optical bursts have an approximately ascending signal strength level and an approximately descending signal strength level.

16. An optical line terminal, comprising:

an optical transmitter operable to transmit optical data to a plurality of remote optical network units (ONUs);

an optical receiver operable to receive optical data bursts from the plurality of remote ONUs, wherein the optical receiver comprises:

an optical detector module operable to receive an optical burst and convert the optical burst into an electrical signal;

a signal strength measurement module for measuring signal strength of the electrical signal;

an automatic gain control (AGC) module operable to adjust a gain of the electrical signal; and a clock and data recovery module coupled to the AGC module operable to convert the electrical signal into binary data;

a media access control (MAC) module operable to receive the binary data from the optical receiver and includes:

a memory operable to store signal strength information associated with optical bursts from the plurality of remote ONUs; and a scheduling module operable to allocate transmission timeslots to the plurality of remote ONUs based on the signal strength information.

17. The optical receiver of claim 16, wherein the scheduling module is further operable to allocate transmission timeslots to the plurality of remote ONUs to reduce differences in consecutive signal strength levels associated with optical bursts from the plurality of optical nodes.

18. The optical receiver of claim 16, wherein the scheduling module is further operable to allocate transmission timeslots to the plurality of remote ONUs in a first scheduling cycle such that optical bursts have an approximately ascending signal strength level and then an approximately descending signal strength level.

19. The optical receiver of claim 16, wherein the scheduling module is further operable to:

determine a priority level for traffic from the plurality of ONUs; and allocate a transmission timeslot for the plurality of ONUs to reduce differences in consecutive signal strength levels of the optical bursts and in response to the priority level for traffic from the plurality of ONUs.

* * * * *